United States Patent
Cook et al.

(10) Patent No.: US 6,465,062 B2
(45) Date of Patent: Oct. 15, 2002

(54) LIGHT-EXCLUDING, MULTI-LAYERED MATERIAL

(75) Inventors: David L. Cook, Lewis Center; Steven R. Dimler, Pickerington; Melissa J. Gamel, Delaware, all of OH (US)

(73) Assignee: Abbott Laboratories, Abbott Park, IL (US)

( * ) Notice: Subject to any disclaimer, the term of this patent is extended or adjusted under 35 U.S.C. 154(b) by 0 days.

(21) Appl. No.: 09/777,172

(22) Filed: Feb. 12, 2001

(65) Prior Publication Data

US 2002/0110654 A1 Aug. 15, 2002

(51) Int. Cl.[7] .................................................. B29D 9/00
(52) U.S. Cl. ..................... 428/34.4; 428/34.4; 428/357; 428/360
(58) Field of Search ............................... 428/35.7, 34.4, 428/36

(56) References Cited

U.S. PATENT DOCUMENTS

| 4,094,407 A | | 6/1978 | Hurst | |
|---|---|---|---|---|
| 5,064,724 A | * | 11/1991 | Ofstein | 428/501 |
| 5,750,226 A | | 5/1998 | Macauley et al. | |

FOREIGN PATENT DOCUMENTS

| GB | 2086342 | | 12/1982 | |
|---|---|---|---|---|
| JP | 2000-264325 | * | 9/2000 | B65D/1/09 |

* cited by examiner

Primary Examiner—Mark L. Bell
Assistant Examiner—Shalie Manlove
(74) Attorney, Agent, or Firm—Michael R. Crabb; Brian R. Woodworth

(57) ABSTRACT

A multi-layered material for use in producing containers. The multi-layered material includes an inner layer, an outer layer, and a regrind layer disposed between the inner layer and the outer layer. The outer layer contains titanium dioxide and the regrind layer contains a dye selected from a group consisting of yellow dye and black dye.

18 Claims, 1 Drawing Sheet

LIGHT-EXCLUDING, MULTI-LAYERED MATERIAL

BACKGROUND OF THE INVENTION

The present invention relates generally to a multi-layer material, and more particularly to a multi-layer material including a regrind layer containing a dye that is selected so as to protect light-sensitive contents of the container from environmental light.

SUMMARY OF THE INVENTION

It is well-known that certain nutritional products are sensitive to light. For example, low acid liquid food products typically contain nutrients, including, but not limited to vitamins such as vitamin B2 (riboflavin), that are sensitive to light. Exposure of such food products to light can result in damage to the biological activity of these nutrients and/or to the taste or other characteristics of the products. This presents a particular challenge in the packaging of food products, including medical and pediatric nutritional products, because such products are subject to labeling requirements that require that the nutritional contents, e.g., vitamin contents, of the food product be specifically identified. In those cases in which the listed nutritional contents are light-sensitive, there may be a reduction in the amount or activity of one or more of the nutritional contents of the product over time due to light exposure, thereby causing the food product to be out of compliance with its labeling. In such a situation, it may be necessary to reduce the shelf-life of the food product, and thus increase the cost of the food product. Alternatively, it may be necessary to increase volume of the nutritional contents of the product, for example, by way of vitamin fortification, which also increases the cost of the food product. It is preferable that a light-protective package be provided so that the nutritional contents of the product remain within the ranges specified in the labeling, thereby providing a longer shelf-life for the product.

U.S. Pat. No. 5,750,226 to Macauley, et al. discloses a bottle designed to provide protection for light-sensitive products contained therein. U.S. Pat. No. 5,750,226 is incorporated herein by reference, in its entirety. Macauley, et al. disclose a bottle having a multi-layered wall structure. The wall includes inner and outer layers of food grade polypropylene, a regrind layer positioned between the inner and outer layers of food grade polypropylene, and a pair of high temperature adhesive layers. The wall further includes barrier layer. The adhesive layers serve to bond the other layers to the barrier layer. Titanium dioxide is incorporated into the food grade polypropylene layers and into the regrind layer in order to reduce light transmission through the wall. The titanium dioxide imparts a white color to each layer in which it is present.

Titanium dioxide is an inert material that can be used in both retort and aseptic packaging techniques. Titanium dioxide is a reflective material, i.e., it works by reflecting light away from the contents of the product. Although titanium dioxide effectively reflects light having a wavelength above approximately 500 nanometers, it has been found that some light having a wavelength below 500 nanometers is reflected when a bottle wall contains relatively high amounts of titanium dioxide. However, as discussed in U.S. Pat. No. 5,750,226, high concentrations of titanium dioxide can create significant problems in the manufacturing of containers. In addition, it can be difficult to achieve high titanium dioxide concentrations in relatively thin container walls.

Although the bottle disclosed by Macauley, et al. provides significantly enhanced light barrier characteristics over prior art bottles, it is desirable to provide new container that is constructed to provide enhanced light barrier characteristics, even when the container wall is relatively thin. In particular, it is desirable to provide a container that is constructed to reduce or eliminate the transmission of light having the wavelengths that will tend to degrade the nutritional contents of a food product contained by the container.

BRIEF DESCRIPTION OF THE DRAWINGS

For a more complete understanding of the present invention, reference may be had to the following Detailed Description read in connection with the accompanying drawings in which.

DETAILED DESCRIPTION

Figure 2:
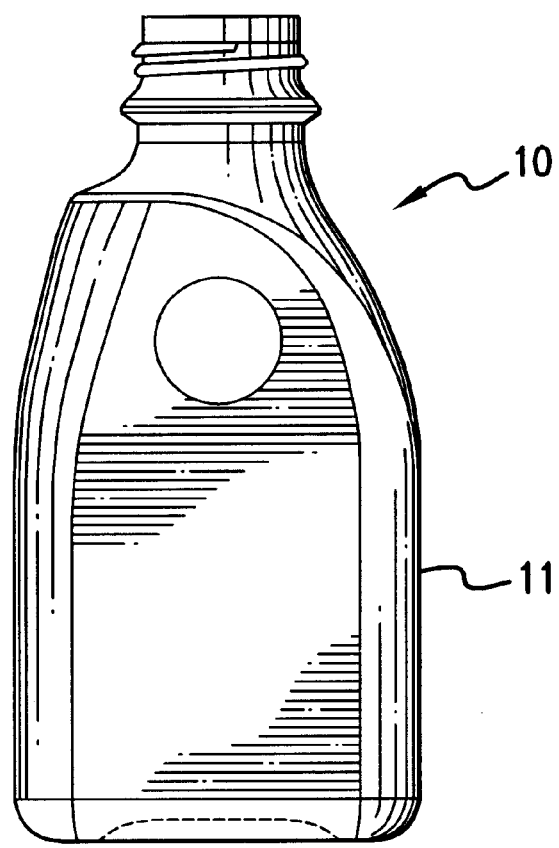
FIG. 2 is a plan view of a bottle constructed of a multi-layer material in accordance with the present invention.

Container 10 of the present invention can have a variety of forms. As depicted in FIG. 2, container 10 is configured as a bottle 11 for a liquid product. However, it will be appreciated that container 10 can have a variety of forms without departing from the spirit and scope of the present invention. For example, container 10 can be configured as a box, a barrel, a vial, or a tube without departing from the intended scope of the invention. Further, container 10 can be the primary container for the contents thereof, i.e., the contents are in direct contact with container 10, or container 10 can in the form of a secondary container, i.e., a light-protective barrier provided over a primary container that is in direct contact with the contents.

Container 10 as described herein, and as depicted in FIG. 2, is particularly suitable for use in the packaging and storage of medical and pediatric nutritional products such as the products manufactured and sold by Abbott Laboratories through its Ross Products Division. The light barrier characteristics of container 10, as described in detail herein, provide enhanced protection for the nutritional contents, e.g., vitamin contents, of such products. However, it is to be understood that container 10 of the present invention can be used in the packaging and storage of other light sensitive products without departing from the intended scope of the present invention.

Container 10 is constructed from a multi-layered wall material 12 having an outer layer 14, an inner layer 16, and a regrind layer 18 disposed between the outer layer 14 and the inner layer 16. Outer layer 14 and inner layer 16 can be constructed of a variety of known materials. In an embodiment of the present invention in which container 10 is constructed to contain a food product, one of ordinary skill in the art will appreciate that outer layer 14 and inner layer 16 can be constructed of polypropylene, high density polyethylene (HDPE), and/or polystyrene. It is not required that outer layer 14 and inner layer 16 be constructed of the same material.

The thicknesses of outer layer 14 and inner layer 16 can vary depending on the packaging needs encountered. However, the U.S. Code of Federal Regulations calls for inner layer 16 to have a thickness of at least approximately 0.002 inches when container 10 is used to contain a food product. In an exemplary embodiment of the present invention, inner layer 16 has a thickness of approximately 0.0036 inches, while outer layer 14 has a thickness of approximately 0.0064 inches. In this exemplary embodiment, outer layer 14 and inner layer 16 are constructed of HPDE, although, as above-discussed, other materials can be used. Also in this exemplary embodiment, regrind layer 18 has a thickness of approximately 0.0184 inches. One of ordinary skill in the art will appreciate that other wall thicknesses are possible without departing from the scope of the present invention.

Regrind layer 18 can be constructed from a variety of materials. For example, regrind layer 18 can be constructed from re-ground material, virgin material, and/or a combination of re-ground and virgin materials. Regrind layer 18 may further include colorants where the colorants are contributed by the re-ground material and/or virgin colorants. The characteristics of regrind layer 18 will be described in greater detail herein.

Figure 1:
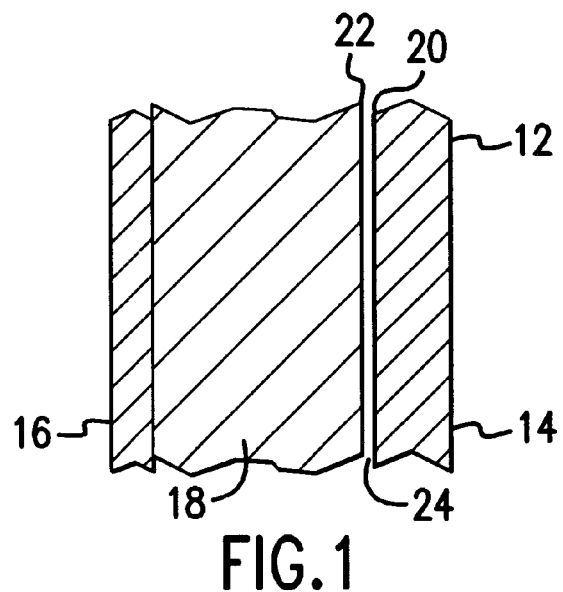
FIG. 1 is a cross-sectional view of a container wall material constructed in accordance with the present invention.

Multi-layered wall material 12 may optionally include an oxygen barrier layer 24, as depicted in FIG. 1. Oxygen barrier layer 24 can be constructed of a variety of known materials known to provide oxygen barrier characteristics, e.g., ethylene vinyl alcohol (EVOH) and nylons. In one embodiment of the present invention, oxygen barrier layer 24 is constructed of EVOH and has a thickness of approximately 0.0009 inches. However, it be appreciated that oxygen barrier layer 24 can have a variety of thicknesses without departing from the scope of the present invention. For example, oxygen barrier layer 24 can of a thickness of 0.0002 inches–0.002 inches.

In one embodiment of the present invention, outer layer 14 is bonded to oxygen barrier layer 24 by way of first adhesive layer 20. Regrind layer 18 is bonded to the opposite side of oxygen barrier layer 24 by way of second adhesive layer 22. First and second adhesive layers 20, 22 can be constructed of a variety of known adhesive materials known to be useful in bonding materials of the type included in multi-layered wall material 12. For example, first and second adhesive layers 20, 22 can be constructed from polyolefin, e.g., a polyolefin layer having a thickness of approximately 0.0004 inches.

In an alternative embodiment of the present invention, oxygen barrier layer 24 is disposed between inner layer 16 and regrind layer 18. In this embodiment, a first adhesive layer is used to bond oxygen barrier layer 24 to inner layer 16, and a second adhesive layer is used to bond oxygen barrier layer 24 to regrind layer 18. One of ordinary skill in the art will recognize that oxygen barrier layer 24 can have other positions relative to inner layer 16, regrind layer 18, and outer layer 14.

In the embodiment of the present invention depicted in the accompanying figures, oxygen barrier layer 24 is positioned between regrind layer 18 and outer layer 14. Placement of the oxygen barrier layer 24 in this position protects layer 24 from moisture which may render it ineffective. In addition, placement of the oxygen barrier layer 24 in this position moves the adhesive layers farther away from the contents of container 10. It will be appreciated that placing the adhesive layers farther away from the contents of container 10 is desirable in those cases in which interaction between the adhesive and the contents may be detrimental to the contents of container 10.

Outer layer 14 and/or inner layer 16 in the exemplary embodiment of the present invention may contain a light barrier additive such as titanium dioxide. The presence of titanium dioxide in outer layer 14 will impart a white color to outer layer 14 which is aesthetically pleasing, thereby making multi-layered material 12 useful in the manufacture of containers for consumer products. Similarly, the presence of titanium dioxide in inner layer 16 will impart a white color to inner layer 16. When multi-layered material 12 is used in the packaging of food products, it may be desirable to provide a white-colored inner wall in order to provide an aesthetically pleasing appearance to the interior of the package. Thus, when a customer looks into the interior of the package, he/she will see a white inner wall surrounding the product contained in the package.

In the exemplary embodiment of the present invention, outer layer 14 and inner layer 16 contain approximately 5% by weight titanium dioxide. As above-discussed, the presence of 5% by weight titanium dioxide in the outer layer 14 will give container 10 an overall white exterior color while the presence of titanium dioxide in the inner layer 16 will give container 10 an overall white interior color. However, it is to be appreciated that the amount of titanium dioxide added to outer layer 14 and/or inner layer 16 can be varied depending upon the desired aesthetics for a container constructed from multi-layered material 12 as well as the desired light barrier characteristics of multi-layered material 12. Further, it will be appreciated that the desired light barrier characteristics of multi-layered material 12 will be dependent upon the intended contents of container 10 as well as the intended ambient light conditions to which container 10, and the product therein, are to be exposed.

Regrind layer 18 also may contain titanium dioxide. It will be appreciated that the presence of titanium dioxide in regrind layer 18 does not impact the aesthetics of a container constructed from multi-layered material 12 because regrind layer 18 is not visible. Rather, titanium dioxide is added to regrind layer 18 solely for the purpose of increasing the light barrier characteristics of multi-layered material 12. Thus, it will be appreciated that the amount of titanium dioxide added to regrind layer 18 can be varied depending upon the desired light barrier characteristics of multi-layered material 12 and depending upon the amount of titanium dioxide contained in outer layer 14 and inner layer 16. That is, if outer layer 14 and inner layer 16 contain little or no titanium dioxide, it will be appreciated that the amount of titanium dioxide incorporated into regrind layer 18 will have to be increased in order to impart the desired light barrier characteristics to multi-layered material 12 of the present invention.

In one embodiment of the present invention, regrind layer 18 is produced using approximately 40% regrind material, for example, reground multi-layered material 12. In this embodiment, regrind layer 18 further includes approximately 60% virgin material, e.g., virgin food grade polypropylene material that does not contain titanium dioxide and a colorant, as discussed in detail herein. Thus, in this embodiment, regrind layer 18 contains approximately 2% by weight titanium dioxide. However, it will be appreciated that regrind layer 18 can be produced from different mixes of virgin and reground material, and that the amount of titanium dioxide and other colorant contained in regrind layer 18 can be varied depending upon the desired light barrier characteristics of multi-layered material 12.

Regrind layer 18 of the present invention contains a colorant or dye selected to reduce the transmittance through regrind layer 18 of light having a wavelength less than 500 nanometers. In one embodiment of the present invention, a yellow colorant containing 1% by weight yellow dye and 99% by weight of a carrier resin, e.g., a high density polyethylene, is incorporated into regrind layer 18. The contents of the carrier resin form no part of the present invention, as one of ordinary skill in the art will appreciate that the type of carrier resin can be varied depending upon the other materials used to construct multi-layered material 12 of the present invention. It will be appreciated that the yellow dye will enhance the light barrier characteristics of multi-layered material 12, thereby providing added light barrier characteristics to a package produced using multi-layered material 12. The yellow dye is effective at reducing the amount of light transmitted by multi-layered wall material 12, particularly light having wavelengths less than 500 nm.

In an alternative embodiment, regrind layer 18 contains a black colorant, e.g., carbon black. As above-discussed, the amount of black colorant used can be varied depending upon the desired light barrier characteristics and the relative thicknesses of the layers of multi-layered material 12. The black dye is effective at reducing the amount of light transmitted by multi-layered wall material 12, particularly light having wavelengths less than 500 nm. Where the black colorant used is carbon black, it is preferable that the carbon black be provided in pelletized form, for reasons that are well known to those of ordinary skill in the art.

Black colorant and yellow colorant have been found to be equally effective in reducing the amount of light having wavelengths less than 500 nm that is transmitted through multi-layered material 12 of the present invention, although it will be appreciated that the black colorant will be effective at reducing the transmission of light at all visible wavelengths, while yellow colorant is effective at wavelengths below 500 nm. In addition, it has been found that the use of black colorant in accordance with the present invention reduces the transmission of ultraviolet light through multi-layered material 12. Thus, by using black colorant, it is possible to protect contents of container 10 from visible and ultraviolet wavelengths. For example, it has been found that vitamin A is susceptible to degradation when exposed to ultraviolet light. It will be appreciated that additives other than black colorant can be included in multi-layered material 12 in order to reduce or block the transmission of ultraviolet light therethrough.

In one embodiment of a multi-layered wall material 12 produced in accordance with the present invention, outer layer 14 constitutes 20.5% by weight of the multi-layered wall material 12. Outer layer 14 in this example includes 89.3% by weight of virgin high density polyethylene and 10.7% by weight of a white colorant containing 80% by weight titanium dioxide. One of ordinary skill will appreciate that outer layer 14 contributes 2.2% by weight of white colorant to multi-layered wall material 12, and that because 80% of the white colorant is titanium dioxide, that outer layer 14 contributes 1.8% by weight of titanium dioxide to multi-layered wall material 12.

In this embodiment of the present invention, multi-layered wall material 12 further includes first and second adhesive layers 20, 22 which collectively constitute 1.35% by weight of multi-layered wall material 12. First and second adhesive layers are constructed from a polyolefin material in this embodiment of the present invention.

Also in this embodiment, inner layer 16 constitutes 12.5% by weight of the multi-layered wall material 12. Inner layer contains 89.3% by weight of virgin high density polyethylene and 10.7% by weight of a white colorant containing 80% titanium dioxide and 20% by weight of an appropriate carrier resin. Thus, inner layer 16 contributes 1.07% by weight of titanium dioxide to multi-layered wall material 12.

Also in this embodiment, multi-layered wall material 12 further includes an oxygen barrier layer that constitutes 2.0% by weight of the multi-layered wall material 12 and is constructed from 100% EVOH.

In this embodiment of the present invention, multi-layered wall material 12 still further includes regrind layer 18 which constitutes 62.3% by weight of the multi-layered wall material 12. Multi-layered wall material 12 contains 59.5% by weight of virgin high density polyethylene and 39.6% by weight of reground, scrap material, where the scrap material is scrap of a multi-layered wall material 12 manufactured in accordance with this first example. In addition, regrind layer 18 contains 0.9% by weight of a yellow colorant. One of ordinary skill will appreciate that the addition of yellow colorant into regrind layer 18 contributes 0.6% by weight of yellow colorant to the multi-layered wall material 12. Assuming that the reground material incorporated into regrind layer 18 contains 0.6% by weight of yellow colorant, the reground material contributes 0.14% by weight of yellow colorant to multi-layered wall material 12. Thus, the yellow colorant in regrind layer 18 constitutes 0.7% by weight of multi-layered wall material 12. In the first example, the yellow colorant contains 1% by weight of yellow pigment or dye and 99% by weight of a carrier resin. Thus, the yellow pigment or dye in regrind layer 18 constitutes 0.007% by weight of the multi-layered wall material 12. It is to be appreciated that the yellow colorant can be replaced with a black colorant, as above-discussed, without departing from the intended scope of the present invention.

In this embodiment of the present invention, multi-layered wall material 12 contains both titanium dioxide and a yellow or black dye, each of which increases the light barrier characteristics of multi-layered wall material 12. In this example, multi-layered wall material 12 contains 0.007% by weight of yellow pigment/dye and 3.5% by weight of titanium dioxide.

It will be appreciated that variations of this embodiment of the multilayered layered wall material 12 of the present invention can be produced without departing from the intended spirit and scope of the present invention. For example, the amounts of titanium dioxide and yellow or black dye included in multi-layered wall material 12 can be varied depending upon the desired light barrier characteristics for a container produced using multi-layered wall material 12. In this regard, it will be appreciated that the desired light barrier characteristics for a package should be determined based upon the light sensitivity of the product to be contained in a package produced using multi-layered wall material 12, as well as the amount and type of light to which the product will be exposed during manufacturing, storage, and sales display of that product.

In the above-discussed example of a multi-layered wall material 12 constructed in accordance with the present invention, it was assumed that the resulting regrind layer 18 contains 0.7% by weight of yellow dye, where 0.6% by weight of yellow dye is contributed by the direct loading of yellow dye and 0.14% by weight of yellow dye is contributed by yellow dye contained in the reground material. It will be appreciated that this example assumes that the amount of yellow dye contained in multi-layered wall material 12 has reached a steady-state, i.e., that the system used to construct multi-layered wall material 12 has been operated for a time sufficient to achieve a state in which the amount of yellow dye contained in multi-layered wall material 12 is no longer increasing or decreasing. In this way, all multi-layered wall material 12 produced contains a predetermined amount of yellow dye. As above-discussed, the yellow dye can be replaced with a black dye.

Although the multi-layered wall material 12 of the present invention has been described herein with respect to certain exemplary and preferred embodiments, one of ordinary skill in the art will appreciate that various modifications to multi-layered wall material 12 can be made without departing from the intended spirit and scope of the present invention, as defined by the appended claims.

What is claimed is:

1. A multi-layered material comprising:
   an inner layer;
   an outer layer;
   a regrind layer disposed between said inner layer and said outer layer;
   said outer layer containing titanium dioxide; and
   said regrind layer containing a yellow dye.

2. A multi-layered material in accordance with claim 1, wherein said inner layer contains titanium dioxide.

3. A multi-layered material in accordance with claim 1, further comprising an oxygen barrier layer, a first adhesive layer, and a second adhesive layer, said first adhesive layer constructed to bond said oxygen barrier layer to an outer surface of said regrind layer, and said second adhesive layer constructed to bond said oxygen barrier layer to an inner surface of said outer layer.

4. A multi-layered material in accordance with claim 3, wherein said oxygen barrier layer is constructed from a material comprising ethylene vinyl alcohol.

5. A multi-layered material in accordance with claim 1, wherein said regrind layer contains titanium dioxide.

6. A package for a light-sensitive product, said package comprising:
   an inner layer;
   an outer layer having an inner surface;
   a regrind layer disposed between said inner layer and said outer layer, said regrind layer having an outer surface;
   a first adhesive layer disposed adjacent said outer surface of said regrind layer;
   a second adhesive layer disposed adjacent said inner surface of said outer layer;
   an oxygen barrier layer disposed between said first adhesive layer and said second adhesive layer, said first and second adhesive layers constructed to bond said oxygen barrier layer to said regrind layer and to said outer layer, respectively;
   said outer layer containing titanium dioxide; and
   said regrind layer containing a yellow dye.

7. A package in accordance with claim 6, wherein said inner layer contains titanium dioxide.

8. A package in accordance with claim 6, further wherein said regrind layer contains titanium dioxide.

9. A package in accordance with claim 6, wherein said oxygen barrier layer is constructed from a material comprising ethylene vinyl alcohol.

10. A package in accordance with claim 6, wherein said regrind layer comprises a virgin high density polyethylene material and a reground material.

11. A package for containing a light-sensitive product, said package comprising:
    titanium dioxide; and
    a yellow dye.

12. A package in accordance with claim 11, wherein said package is constructed from a multi-layered material.

13. A package in accordance with claim 12, wherein said multi-layered material includes an outer layer, an inner layer, and a regrind layer disposed between said inner layer and said outer layer, and wherein said dye is present in said regrind layer.

14. A package in accordance with claim 13, wherein said titanium dioxide is present in said outer layer.

15. A package in accordance with claim 13, wherein said titanium dioxide is present in said regrind layer.

16. A package in accordance with claim 13, wherein said titanium dioxide is present in said inner layer.

17. A multi-layered material comprising:
    an inner layer;
    an outer layer;
    a regrind layer disposed between said inner layer and said outer layer;
    said outer layer containing titanium dioxide;
    said regrind layer containing a black dye; and
    said material being free of an interlayer of black pigment compound resin disposed between said regrind layer and one of said inner layer and said outer layer.

18. A package for a light-sensitive product, said package comprising:
    an inner layer;
    an outer layer having an inner surface;
    a regrind layer disposed between said inner layer and said outer layer, said regrind layer having an outer surface;
    a first adhesive layer disposed adjacent said outer surface of said regrind layer;
    a second adhesive layer disposed adjacent said inner surface of said outer layer;
    an oxygen barrier layer disposed between said first adhesive layer and said second adhesive layer, said first and second adhesive layers constructed to bond said oxygen barrier layer to said regrind layer and to said outer layer, respectively;
    said outer layer containing titanium dioxide;
    said regrind layer containing a black dye; and
    said package being free of an interlayer of black pigment compound resin disposed between said regrind layer and one of said inner layer and said outer layer.

* * * * *